United States Patent
Losee

[15] 3,703,304
[45] Nov. 21, 1972

[54] CONSTRUCTION ELEMENT WITH ANCHOR TEETH

[72] Inventor: Walter J. Losee, Indianapolis, Ind.

[73] Assignee: Atlas Engineering Products, Inc., Indianapolis, Ind.

[22] Filed: Sept. 9, 1971

[21] Appl. No.: 178,894

Related U.S. Application Data

[63] Continuation-in-part of Ser. No. 876,794, Nov. 14, 1969, abandoned.

[52] U.S. Cl. ............287/20.92 L, 287/20.94, 85/13, 52/712
[51] Int. Cl. .............................................F16b 5/00
[58] Field of Search ........287/20.92 L, 20.94; 85/13, 85/11; 52/712, 715, DIG. 8

[56] References Cited

UNITED STATES PATENTS

| | | | |
|---|---|---|---|
| 1,520,026 | 12/1924 | Hugh | 287/20.92 L UX |
| 2,974,378 | 3/1961 | Lidsky | 287/20.92 L UX |
| 3,242,788 | 3/1966 | Broder | 85/13 |
| 3,277,768 | 10/1966 | Templin et al. | 85/13 |
| 3,347,126 | 10/1967 | Templin et al. | 85/13 |
| 3,377,905 | 4/1968 | McAlpine | 85/13 |
| 3,417,652 | 12/1968 | Menge | 85/13 |

Primary Examiner—David J. Williamowsky
Assistant Examiner—Wayne L. Shedd
Attorney—Harold B. Hood

[57] ABSTRACT

A construction element of the multiple tooth or nail type in which the long, narrow teeth are arranged in pairs, each tooth of each pair projecting in the same general direction substantially perpendicularly from a plate, being integral with the plate and being formed on one lateral edge only with a spur extending generally toward the mating tooth and with a relief region between the spur and the tooth base, the teeth being longitudinally dished in their facing surfaces and being twisted in a common direction so that the spurred edge of each tooth is advanced toward its mating tooth.

4 Claims, 12 Drawing Figures

PATENTED NOV 21 1972 3,703,304

INVENTOR
WALTER J. LOSEE
BY
Hood, Gust, Irish, Lundy & Coffey
ATTORNEY

INVENTOR
WALTER J. LOSEE

CONSTRUCTION ELEMENT WITH ANCHOR TEETH

This application is a continuation-in-part of my copending application Ser. No. 876,794 filed Nov. 14, 1969 for "Construction Element with Anchor Teeth," now abandoned.

The present invention relates to a construction element of the multiple nail type, exemplified in, but not necessarily limited to, truss plates and hangers. The primary object of the invention is to provide, in such a device, a novel form of tooth displaying, in the environment under consideration, significant advantages over previously known tooth forms.

A further object of the invention is to provide, in such an element, teeth of such form that they will enter wooden or analogous pieces with a minimum tendency to split or splinter, or even to cut the fibers of, the entered material.

Still another object of the invention is to provide, in such an element, a tooth form which, when it has entered such a material, will provide improved resistance to withdrawal.

An additional object of the invention is to provide, in such an element, a tooth form including, on one lateral edge, a withdrawal-resistant spur designed and arranged to shove aside rather than to cut, the resilient fibers of an entered material, the same lateral tooth edge being provided with a relief immediately adjacent the spur and between the spur and the tooth base, and into which those displaced, resilient fibers can crowd after the spur has passed.

Still another object of the invention is to provide a tooth form which lends itself to improved ease of production in the manufacture of such a construction element.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 5:
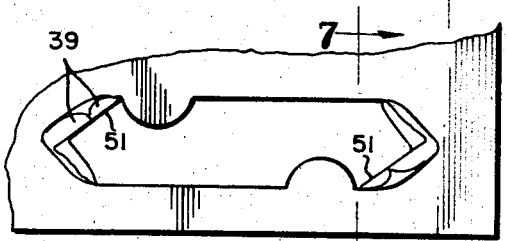
FIG. 5 is a fragmentary plan view of a portion of a construction element embodying my invention and illustrating the twisted form of the teeth thereof.
Figure 7:
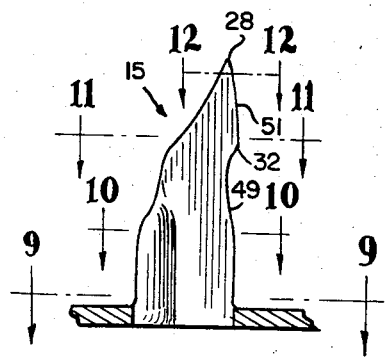
Figure 8:
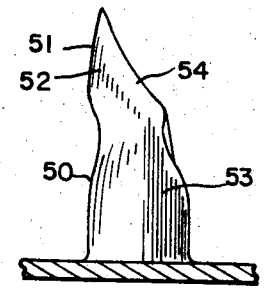
Figure 9:
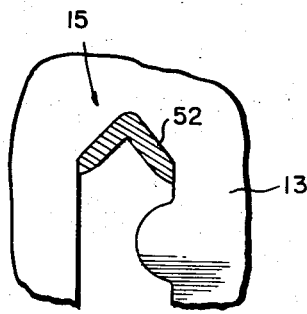
Figure 10:
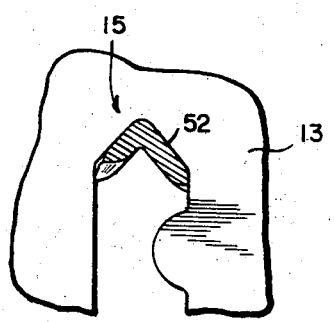
Figure 11:
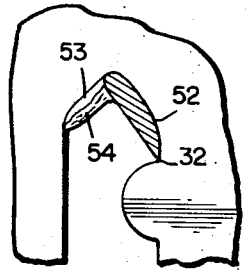
Figure 12:
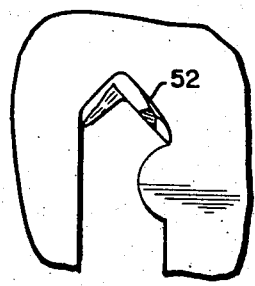

FIG. 7 is a section taken on the line 7—7 of FIG. 5;
FIG. 8 is a section taken on the line 8—8 of FIG. 5;
FIG. 9 is a section taken on the line 9—9 of FIG. 7;
FIG. 10 is a section taken on the line 10—10 of FIG. 7;
FIG. 11 is a section taken on the line 11—11 of FIG. 7; and
FIG. 12 is a section taken on the line 12—13 of FIG. 7.

Figure 1:
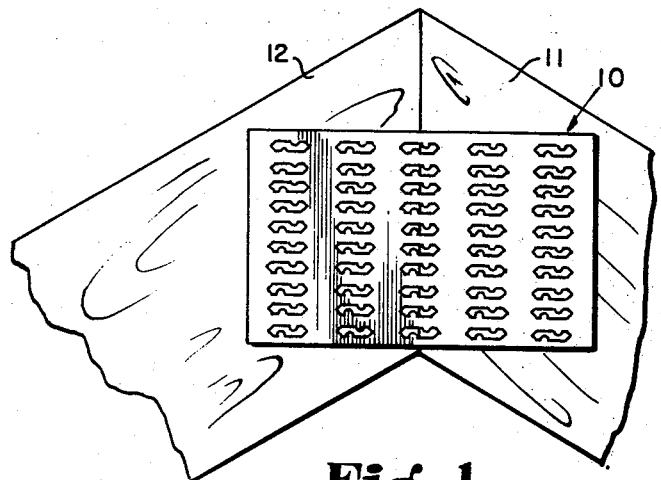
FIG. 1 is a fragmentary elevation of the peak region of a truss, showing a truss plate constructed in accordance with the present invention associated therewith to secure the elements together.
Figure 3:
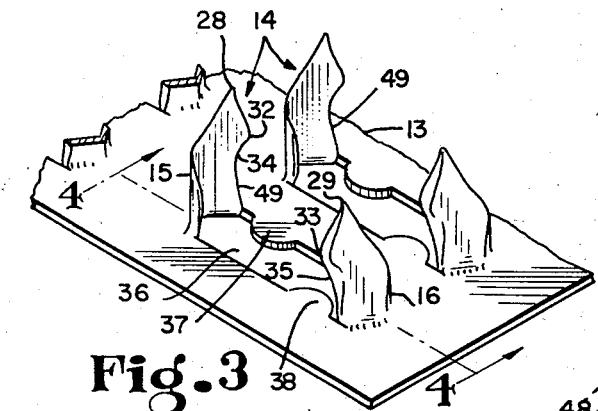
FIG. 3 is a fragmentary perspective view, drawn to a greatly enlarged scale, and illustrating the tooth form which constitutes the gist of my invention.
Figure 4:
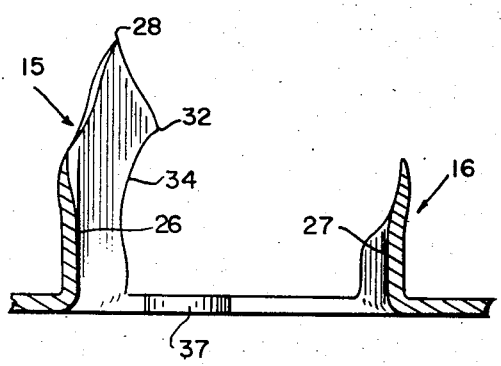
FIG. 4 is a fragmentary sectional view taken substantially in the plane indicated by the line 4—4 in FIG. 3.

Referring more particularly to the drawings, it will be seen that, in FIG. 1, I have illustrated a truss plate 10 cooperatively engaged with elements 11 and 12 of a truss to hold said elements in assembled relation. As is more clearly shown in FIGS. 3 and 4, the construction element 10 comprises a plate 13 of ductile metal from one surface of which project, substantially in a common direction perpendicular to the plate surface, a multiplicity of teeth or nails indicated generally by the reference numeral 14. Said teeth are preferably arranged in mating, allochirally related pairs 15 and 16. In the illustrated embodiment, the several pairs of teeth are arranged in straight rows longitudinally of the plate and the teeth of each pair are arranged in straight lines transversely of the plate; but this arrangement is not essential to my invention and the several tooth pairs may be staggered or randomly arranged on the plate 13, so long as the illustrated relationship of the teeth of each pair is maintained.

Figure 6:
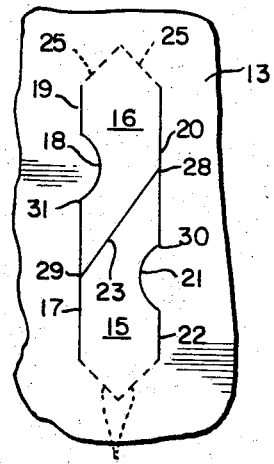
FIG. 6 is a fragmentary plan view of a portion of a plate, illustrating the lines on which such plate is lanced and bent in the production of the tooth form of my invention.

FIG. 6 is in the nature of a diagram showing the lines upon which a plate will be lanced, slashed, cut and bent in the formation of a pair of teeth. As to each pair of teeth, the plate will be cut on a straight line 17 which merges with a part-circular arc 18, and on a further straight line 19 aligned with the line 17. The plate will also be cut on a straight line 20 parallel with the line 19 and merging with a part-circular arc 21, and on a straight line 22 aligned with the line 20. The plate will also be cut upon a diagonal line 23 which extends from a point on the line 17 at which a perpendicular includes the center of the arc 21 which is offset to the right from the lines 20, 22, to a point on the line 20 at which a perpendicular includes the center of the arc 18 which is offset to the left from the lines 17, 19. The intersection of the line 23 with the line 20 thus defines the tip 28 of a tooth 15, while the intersection of the line 23 with the line 17 defines the tip 29 of a tooth 16.

In one preferred embodiment of my invention, the length of each of the lines 17 and 20 is 0.280 inch, the length of each of the lines 19 and 22 is 0.080 inch, the distance between the lines 17,19 and 20,22 is 0.140 inch, the radius of each of the arcs 18 and 21 is 0.065 inch, the center of the arc 18 is disposed on a line perpendicular to the line 20 and bisecting that arc, and is offset 0.029 inch to the left of the line 17,19, the center of the arc 21 is disposed on a line perpendicular to the line 17 and bisecting the arc and is offset 0.029 inch to the right of the line 20,22, and the distance between the adjacent ends of the lines 17 and 19 and between the adjacent ends of the lines 20 and 22 is 0.100 inch.

Now, the teeth 15 and 16 are bent in a common direction out of the plane of the plate 13 and into substantial perpendicularity with said plane, while the tooth 15 is concurrently dished about the axial line 26 and the tooth 16 is dished about the axial line 27. Thus, the bases of the formed teeth 15 and 16 are disposed substantially upon the bend lines 24 and 25, respectively.

The cutting and bending steps above described may advantageously be substantially simultaneously per-formed by means of a multiple punch and die set. Thus it will be apparent that the teeth are by no means uniform to the thousandth of an inch, but that the dimensions set forth above are typical or average.

As the teeth are thus formed and bent, the points 30 and 31 tend to "hang," whereby the tooth 15 is twisted in a clockwise direction as viewed in FIG. 5 and the tooth 16 is likewise twisted in a clockwise direction as viewed in FIG. 5. The degree of such twist is in the range between 30° and 60° and is preferably about 45°.

As the teeth are so formed, furthermore, their longer lateral edges are somewhat drawn whereby, in the finished tooth, the reliefs 34 and 35 are not exactly circular arcs but instead their mouths are somewhat longer than the bases of the beads 37 and 38 which remain in the plane of the plate 13, projecting into the hole 36.

Further, I have found that the tendency of the teeth to "hang" at the points 30 and 31 results in the formation of spurs 32 and 33 extending generally toward the mating tooth of each pair.

The dishing of the teeth, together with the twisting thereof which moves the spurred edge of each tooth toward its mate, combine to produce, in effect, the equivalent of bevels 39 at the tip region of each tooth.

I have found that the particular shape of the teeth, as described above, produces significant improvements in the use of construction elements of the multiple tooth or nail type. The above-described twist brings the leading edge 51 of the tooth very nearly into alignment with the grain of the wood so that the tooth surface 52 exerts a camming action upon the wood fibers as the tooth advances into the wood, while the tooth surface 53, being relatively short and preceded by the laterally-sloping edge 54 resulting from the slash line 23, cooperates in the separation of the wood fibers. The reliefs 34 and 35 further militate against splitting or splintering of the wood as the nails penetrate wooden members; and the spurs 32 and 33 very significantly improve the resistance of the teeth against withdrawal, particularly in view of the existence of the reliefs 34 and 35. For instance, the Federal Housing Agency of the United States Government has given an allowance of 185 lbs. per square inch to a plate constructed in accordance with the present disclosure.

It will be seen that, in the preferred embodiment of my invention, the length:width ratio of each tooth, in its flat form before it is bent out of the plane of the plate 13, is approximately 2.64:1 or slightly more than 13.5. As has been explained, each tooth is dished about a longitudinal line as it is formed, thus reducing its effective width and increasing the length:width ratio. In the preferred form, the dishing results in bringing the lateral edges of the teeth closer together so that, approximately at the level of the spur 32 or 33, the lateral edges of the tooth are spaced apart by approximately 0.125 inch to produce an effective length:width ratio of 3.68:1. But because of the twist of the tooth, the tooth dimension at that level, when measured in a direction perpendicularly transverse to the hole 36 is only approximately 0.0625 inch. Thus, from the viewpoint of the wood being penetrated, the effective length:width ratio of the typical tooth is approximately 7.35:1.

Of course, at a point 0.130 inch from the plate, the tooth width begins to decrease radically as the inclined edge formed by the cut line 23 approaches the tooth tip, and the dishing begins to disappear until, when the line 23 crosses the line 26 or 27, the remaining distal region of the tooth becomes transversely flat.

As a consequence, when a construction member embodying the present invention is driven or pressed into a piece of wood or similar material with the holes 36 substantially aligned with the grain of the wood, the initially-entering tip regions of the teeth encounter the wood substantially in alignment with the wood fibers. As the teeth progress into the wood, their opposite flat surfaces turn generally about their axis of movement to tend to separate the fibers, crowding those fibers aside, substantially without cutting them, until the spur 32 or 33 passes, whereafter, under continued tooth movement, the displaced fibers can crowd, by their natural resiliency, into the relief region 34 or 35. Thus, when a plate has been pressed home, a significant quantity of uncut wood fibers will lie, between the spur 32 or 33 and the surface of the wood, within the relief regions; and those quantities of fibers will have been compressed and/or compacted by the action of the shoulders 49 or 50 beneath the relief regions, as the member has been pressed home. I presently believe that it is this unique action which is largely responsible for the remarkable resistance to withdrawal which is displayed by the teeth of the present invention.

Figure 2:
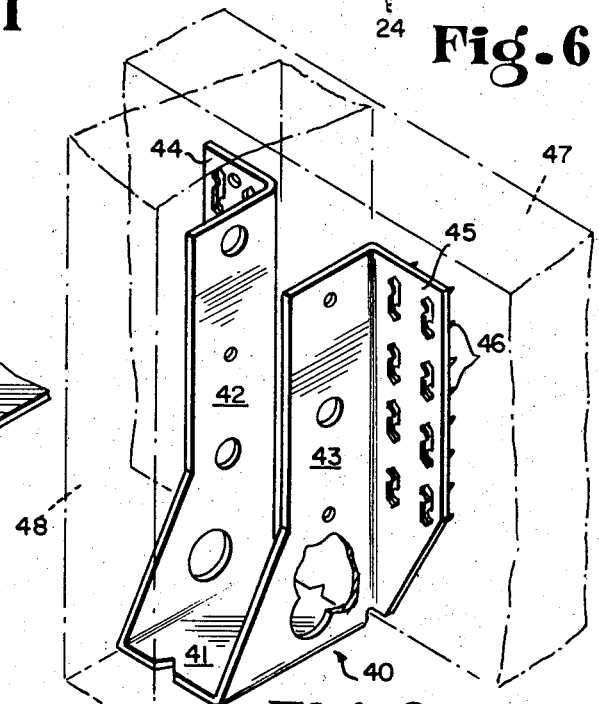
FIG. 2 is a perspective view of a hanger constructed in accordance with the present invention, fragments of a beam and a joist operatively associated therewith being illustrated in shadow outline.

In FIG. 2, I have illustrated a different form of construction element, known in the trade as a hanger. Such a hanger 40 is usually formed from sheet metal to define a floor 41, spaced, parallel side walls 42 and 43 and outwardly extending wings 44 and 45, each of which may be deemed a "plate." Each of the wings or plates 44 and 45 is formed, according to my invention, with a multiplicity of teeth 46 which are, in all respects, the same as the teeth 14 illustrated in FIG. 3. In use, the teeth 46 of the wings 44 and 45 will be driven or pressed into, for instance, a beam 47 to receive and support a joist or stud 48, resting on the hanger floor 41 and confined between the side walls 42 and 43 of the hanger.

I claim as my invention:

1. A construction element comprising a metal plate, a multiplicity of teeth protruding generally in a common direction from one surface of said plate, each tooth having a base and a tip and each tooth having a length-to-width ratio of at least approximately 13:5, each tooth being formed in one lateral edge only with an inwardly curved relief defining a spur at the distal end of said relief, said teeth being arranged in facing allochirally related pairs and each spur being located in a region nearer to the tip than to the base of its tooth, and each tooth being twisted through an angle of from 30° to 60° about its longitudinal axis to dispose its spurred edge closer than its other edge to the other tooth of the pair and to increase the effective length:width ratio of the tooth.

2. The element of claim 1 in which each tooth of a pair is dished, substantially about its longitudinal axis, in that face which is presented toward the other tooth of the pair, further to increase the effective length:width ratio of the tooth.

3. The element of claim 1 in which the degree of twist of each tooth is approximately 45°.

4. The element of claim 1 in which the unspurred edge of each tooth inclines distally beyond the relief to meet the spurred edge in a sharp point.

* * * * *

PO-1050
(5/69)

UNITED STATES PATENT OFFICE
CERTIFICATE OF CORRECTION

Patent No. 3,703,304      Dated November 21, 1972

Inventor(s) Walter J. Losee

It is certified that error appears in the above-identified patent and that said Letters Patent are hereby corrected as shown below:

In the caption, the name of the assignee should read -- Atlas Engineered Products, Inc. --.

Column 2, line 5 should read -- FIG. 12 is a section taken on the line 12-12 of FIG. --; line 17 should read -- ranged in reversely mating pairs 15 and 16. --.

Column 3, line 51, "13.5" should read -- 13:5 --.

Column 4, lines 53 and 54 (Claim 1, lines 8 and 9) should read -- end of said relief, said teeth being arranged in reversely mating pairs and each spur being located in a --.

Signed and sealed this 17th day of April 1973.

(SEAL)
Attest:

EDWARD M. FLETCHER, JR.       ROBERT GOTTSCHALK
Attesting Officer      Commissioner of Patents